United States Patent Office 3,442,976
Patented May 6, 1969

3,442,976
COATING COMPOSITIONS COMPRISING A CAR-
BOXYLIC ACID AMIDE POLYMER AND A POLY-
MER OF VINYL FLUORIDE
Gene Gerek, Cheswick, Pa., assignor to PPG Industries,
Inc., Pittsburgh, Pa., a corporation of Pennsylvania
No Drawing. Filed May 23, 1966, Ser. No. 551,886
Int. Cl. C08g 37/32; C08f 29/16
U.S. Cl. 260—853
8 Claims

ABSTRACT OF THE DISCLOSURE

Coating compositions containing polymers of vinyl chloride are enhanced by the addition of aldehyde-modified interpolymers of polymerizable unsaturated carboxylic acid amide and other copolymerizable ethylenically unsaturated monomers.

---

This invention relates to useful and novel resinous materials and pertains more particularly to coating compositions comprising an aldehyde-modified unsaturated carboxylic acid amide interpolymer and a polymer of vinyl fluoride.

Interpolymers and unsaturated carboxylic acid amides, and especially aldehyde-modified, etherified interpolymers of amides, and other ethylenically unsaturated monomers, such as those disclosed in U.S. Patent 3,037,963, have been utilized extensively in coating compositions. For example, they are employed as resinous vehicles for enamels and other thermosetting compositions. When so used, such interpolymers give very tough and mar-resistant films having excellent chemical resistance.

Coating compositions can also be produced from polymers of vinyl fluoride, and the resultant coatings possess outstanding durability and flexibility. Films of such polymers, however, have little or no adhesion to surfaces such as galvanized steel and aluminum, as well as other metals, and these polymers are therefore usually prepared as unsupported films.

Ordinarily, vinyl fluoride coatings are prepared as free films and laminated, by means of special adhesives, to the surface to be coated and thus cannot be readily adapted to conventional coating operations. Roll coating, for example, is one of the most economical and widely used coating methods but, because of flow problems with polyvinyl fluoride, such method can be used only with great difficulty. Although techniques have been devised in an attempt to eliminate this disadvantage, the required adhesion cannot be obtained except by using temperatures and exposure times greatly in excess of those used in conventional coating operations.

It has now been discovered that outstanding coating compositions are obtained by combining aldehyde-modified unsaturated carboxylic acid amide interpolymers and polymers of vinyl fluoride. The resultant coatings possess a surprising combination of properties, including excellent adhesion, and are well-suited for use in all conventional coating operations.

Coatings made from the compositions of this invention have several superior properties, in some cases surpassing the properties of the excellent coatings described above, comprising the amide interpolymer alone. For example, the outstanding adhesion of these coatings during elongation almost completely eliminates delamination during severe forming operations, a serious and common coating failure which occurs when the cured film separates from the substrate during fabrication of articles from the coated metal. Furthermore, this outstanding adhesion, as well as the other properties of these coatings, are attained with curing schedules employing conventional temperatures and curing times.

It is especially surprising that the use of even small amounts of the amide interpolymer produces such outstanding adhesion, in view of the almost complete absence of this highly desirable property in coatings prepared from polyvinyl fluoride alone. As little as about 2 percent by weight of the coating composition may comprise the amide interpolymer component without any significant decrease in adhesion.

Another advantage of the compositions herein is that they possess excellent flow properties. Flow is a measure of the ability of film to settle on a metal surface and such property is usually lacking in dispersions of vinyl fluoride polymers. However, in the compositions of this invention, it is found that such desirable flow properties are obtained. Consequently, such coating compositions can be utilized in conventional application methods and cured with conventional curing schedules.

Coatings made from the compositions of this invention also possess excellent appearance, as well as superior salt-fog resistance, excellent chemical resistance, and exceptionally high heat stability.

In addition to the properties described above, there is a retention in the coating compositions of this invention of the other desirable properties which are characteristic of the individual components of this invention. For example, polymers of vinyl fluoride can be made into highly flexible coatings, and the coatings of this invention also possess this property. Similarly, coatings made from the compositions of this invention have excellent impact resistance, mar resistance, water resistance and other such advantageous features.

The uses of the compositions of this invention are many and varied due to the numerous excellent qualities of the resultant coatings. For example, they can be used as interior coatings for drums, pipes and the like, as well as exterior finishes on metal surfaces, such as aluminum siding. They can also be used as table top coatings, refrigerator interior coatings, and in similar applications wherein their unique protective and decorative properties are utilized.

The amide interpolymer component of the compositions of this invention can be any aldehyde-modified interpolymer of an unsaturataed carboxylic acid amide; the aldehyde-modified interpolymer is preferably at least partially etherified. Aldehyde-modified amide interpolymers are obtained by polymerizing an unsaturated amide and at least one ethylenically unsaturated monomer and reacting the initial product of the polymerization with an aldehyde. Etherification is carried out by further reaction of the aldehyde-modified interpolymer with an alcohol. Alternatively, aldehyde-modified interpolymers are produced by interpolymerizing an aldehyde-modified amide, such as an alkylol amide, which may be then etherified, if desired, or by employing an N-alkylol amide or an N-alkoxylalkyl amide.

In any case, the aldehyde-modified, etherified amide interpolymer contains amide groups having at least one hydrogen atom replaced by the structure:

where R is hydrogen or a hydrocarbon radical and $R_1$ is hydrogen in unetherified groups or an organic radical derived by removing the hydroxyl group from the etherifying alcohol.

Methods of producing N-alkoxyalkyl-substituted unsaturated carboxylic acid amides such as N-butoxymethyl acrylamide, which amides are quite useful to produce the amide interpolymers employed herein, are disclosed in U.S. Patent Nos. 3,079,434 and 3,087,965. When these and similarly substituted unsaturated carboxylic acid amides are polymerized, the resulting reaction product contains the aforesaid structure without any further treatment.

After etherification, the amide interpolymer contains amido groups having a hydrogen atom replaced by the structure:

where R is hydrogen when the aldehyde employed is formaldehyde and an alkyl radical when other aliphatic aldehydes are used. $R_1$ is the radical derived by removing a hydroxyl group from the etherifying alcohol, i.e., an organic radical. $R_1$ in the etherified groups can be, for example, alkyl or aryl. The terms alkyl and aryl, as employed herein, are to be construed broadly; the groups represented by $R_1$ are preferably alkyl radicals containing from 1 to 8 carbon atoms but may include other substituents and functional groups which do not affect the properties of the product. Thus, $R_1$ may include unsaturated linkages, ether linkages, halogens, and other substituents, or it may be cyclic.

Satisfactory products may in some instances be obtained with one or only a very small part of the aldehyde-modified amide groups having been etherified, in some instances 5 percent or less. However, it is usually desirable that at least about 50 percent of these groups be etherified, since many compositions having less than about 50 percent of the groups etherified have a tendency to be somewhat less stable and subject to gelation.

Butanol is a preferred alcohol for use in the etherification, although any monohydric alcohol such as methanol, ethanol, propanol, pentanol, octanol, decanol and other alkanols containing up to about 20 or more carbon atoms may also be employed, as may aromatic alcohols, such as benzyl alcohol; or cyclic alcohols, such as cyclohexanol; or the monoethers of glycols, such as ethylene glycol monobutyl ether, diethylene glycol monobutyl ether and other mono- or dialkyl ethers of ethylene glycols and their derivatives, and similar alcohols; or substituted alcohols, such as 3-chloropropanol.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives, such as N-carbamyl maleimide, may also be utilized.

At least one other copolymerizable unsaturated monomer is then interpolymerized with the unsaturated carboxylic acid amide; any copolymerizable ethylenically unsaturated monomer can be so utilized.

A preferred coating composition of this invention is obtained, however, when acrylonitrile or methacrylonitrile, or both, are employed. Other monomers include monoolefinic and diolefinic hydrocarbons, halogenated monoolefinic and diolefinic hydrocarbons, unsaturated esters of organic and inorganic acids, esters of unsaturated acids, nitriles, unsaturated acids, and the like. The interpolymer compositions described in U.S. Patent 3,307,963 are excellent examples of the preferred type of amide polymers utilized in the instant invention, and the compounds disclosed therein illustrate the numerous comonomers which can be used and the manner of carrying out the interpolymerization.

Preferably, the amide interpolymer should contain from about 2 percent to about 50 percent by weight of the unsaturated carboxylic acid amide monomer, about 2 percent to about 30 percent of either acrylonitrile or methacrylonitrile, or both, with the balance being any of the other ethylenically unsaturated monomers.

In carrying out the polymerization reaction a catalyst is ordinarily utilized, which can be a peroxygen compound such as cumene hydroperoxide, lauroyl peroxide, benzoyl peroxide, or a similar compound. Azo compounds, such as alpha,alpha'-azo bisisobutyronitrile, may also be used, as may redox catalyst systems. In many instances it is desirable to add a chain modifying agent, such as a mercaptan, to the polymerization mixture.

The polymerization to produce the amide interpolymer is typically carried out by admixing the amide, any other monomer or monomers, and the catalyst and chain modifying agent, if any, in the solvent, and refluxing the resulting solution for a time sufficient to obtain the desired conversion. Ordinarily, the polymerization will be complete in about 1 to about 16 hours. It is often desirable to add the catalyst in increments as the polymerization progresses, and good agitation and careful temperature control are also desirable because of the very rapid reaction rate and because the reaction is highly exothermic.

When necessary to produce the desired structures, the carboxylic acid amide is reacted with an aldehyde, preferably in the presence of an alcohol. Formaldehyde, in solution in water (Formalin) or in an alkanol such as butanol, or a formaldehyde-yielding substance such as paraformaldehyde, trioxymethylene, or hexamethylenetetramine, is preferred, but other aldehydes, including acetaldehyde, butyraldehyde, and the like, can be used. It is ordinarily preferred to utilize about two equivalents of aldehyde for each amido group present in the interpolymer, although this ratio may be raised or lowered considerably if desired.

To produce the preferred aldehyde-modified and etherified products, the reaction is usually carried out by refluxing the aldehyde, alcohol and interpolymer in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; the more acidic the reaction medium, the greater the amount of etherification which will occur.

As noted above, similar polymeric materials may also be obtained by polymerizing a modified amide, such as an N-alkylolamide or an N-alkoxyalkyl amide. The polymerization utilizing an N-alkylolamide or an N-alkoxyalkylamide can be carried out in substantially the same manner as when the unmodified amide is interpolymerized.

In addition to the amide interpolymer described above, the other essential component of the compositions of this invention is a polymer of vinyl fluoride. These polymers may be prepared by polymerization methods well known in the art, such as are taught in U.S. Patents Nos. 2,810,702 and 2,419,008.

While the new compositions described herein preferably employ a homopolymer of vinyl fluoride, i.e., polyvinyl fluoride, they are also applicable to copolymers of vinyl fluoride containing a major proportion of vinyl fluoride. Preferably, such copolymers contain at least 95 mol percent of the vinyl fluoride. Suitable comonomers are the halogenated ethylenes, such as symmetrical dichlorodifluoroethylene, 1,1,2-trifluoro-2-chloroethylene, tetrafluoroethylene, vinyl chloride, and others. Whenever the term "polymer of vinyl fluoride" is used in this application, it refers to the homopolymer or the copolymer as described above.

The proportions of the two components of this invention are not ordinarily critical. A preferred coating composition is obtained when the two components are present in equal amounts. It has been found, however, that amounts of the polymer of vinyl fluoride component varying from about 25 percent to about 98 percent, based on the total weight of the vinyl fluoride polymer and the amide interpolymer, also produce desirable properties.

The amide interpolymer component can, therefore, be present in an amount between about 2 percent and about 75 percent by weight.

The coating compositions of this invention may be formulated by simply admixing a solution of the amide interpolymer with either a colloidal solution of the vinyl fluoride polymer, employing a strongly polar organic solvent such as γ-valerolactone, γ-butyrolactone, dimethyl acetamide or dimethyl sulfoxide, or a suspension of the vinyl fluoride polymer in a high-boiling organic liquid such as isophorone, dimethyl phthalate or diethyl phthalate. Alternatively, the vinyl fluoride polymer, as a powder, may be ground into the amide interpolymer solution or such polymer may be added during the polymerization of the amide interpolymer when suitable. Although it is often desirable to heat the solution of components during the combining operation, the components may usually be blended together in the cold state, if desired. The solvent is similarly not critical and any solvent which will dissolve both components may be employed, such as, for example, butanol, dimethyl phthalate and various high-boiling aromatic hydrocarbons.

It is not known with certainty whether a reaction between the two components occurs, but it is possible that reaction to some extent takes place either during the formulation of the composition or during curing of the coatings produced therefrom.

The compositions described can be used as such to make clear films, but more usually they are utilized as the vehicle in compositions in which there is incorporated a pigment composition. Essentially any conventional pigment can be used; the pigment composition may include, for example, titanium dioxide, carbon black, talc, barytes, zinc sulfate, strontium chromate, barium chromate, ferric iron oxide, as well as color pigments such as cadmium yellow, cadmium red, phthalocyanine blue, chromic yellow, toluidine red, hydrated iron oxide and the like. The coating compositions are ordinarily produced by first dispersing the amide interpolymer component with the pigment composition, in accordance with well-known practice, and subsequently combining with the polymer of vinyl fluoride. In some cases the pigment may be dispersed after the two components have been combined but it is usually not desirable to disperse the pigment in the polymer of vinyl fluoride component alone.

Additional resins may be used in combination with the composition of this invention. A few of these are: epoxide resins such as the polyglycidyl ethers of polyhydric compounds, particularly the polyglycidyl ethers of bisphenolic compounds, for example, the diglycidyl ether of Bisphenol A; other vinyl halide resins such as polyvinyl chloride and vinyl chloride-vinyl acetate copolymers; amine resins, such as hexakis(methoxymethyl) melamine and other condensation products of formaldehyde with urea, melamine or benzoguanamine; nitrocellulose; and hydrocarbon resins, such as polyethylene and polypropylene. These resins may be used in widely varying amounts, for example, from about 5 percent or lower to about 50 percent or higher by weight, based on the resin solids content of the amide interpolymer.

In ordinary usage of the coating compositions of this invention, they are applied to the article to be coated, for example, by spraying, roll coating, or similar conventional technique, and then baked to form a hard, adherent film. Typical baking schedules include 300° F. for 30 minutes to 500° F. for 1 minute.

There are set forth below several examples which illustrate the nature and properties of the coating compositions of the invention. However, the invention should not be considered as being limited to their details. All parts percentages in the examples and throughout this specification are based on resin solids content and are by weight unless otherwise specified.

EXAMPLE 1

An aldehyde-modified acrylamide interpolymer was prepared from the following:

| | Parts by weight |
|---|---|
| Acrylamide | 92.0 |
| Methacrylic acid | 46.0 |
| Acrylonitrile | 368.0 |
| Ethyl acrylate | 1335.0 |
| Butanol | 460.0 |
| Xylene | 460.0 |
| Tertiary dodecyl mercaptan (chain modifying agent) | 55.2 |
| t-Butylperoxy isopropyl carbonate (catalyst) | 2.3 |

The foregoing mixture was heated to 205° C., over a 1½ hour period, at which time refluxing began. After ½ hour of refluxing, 21.7 parts of aromatic naphtha with a boiling range of 187° C. to 205° C. and 1.1 parts of the catalyst were added. After each of two successive one-hour periods, the same amounts of the catalyst and aromatic naphtha were added. After each of the next two one-hour intervals, the same amount of aromatic naphtha was used but the amount of catalyst added was 0.6 part. After a final one-hour interval of refluxing, the mixture was cooled to 220° C. and 93.0 parts of 40 percent formaldehyde in butanol, 2.4 parts of maleic anhydride and 313 parts or aromatic naphtha were added. Immediately thereafter, another 21.7 parts of aromatic naphtha were added along with 0.6 part of catalyst. Azeotropic distillation was then conducted for 3 hours, removing 23 parts of water, after which 484 parts of aromatic naphtha was added.

The product of the above preparation had a solids content of 49.8 percent, Gardner-Holdt viscosity of Z–Z$_1$, color (Gardner) of 6+ and an acid number of 7.6. The amount of water azeotroped off was 23 parts by weight and the acid number was 7.6.

A coating composition was prepared by thoroughly blending, at room temperature, 50 parts of the amide interpolymer prepared above with 50 parts of polyvinyl fluoride and 200 parts of the solvent, dimethyl phthalate. The polyvinyl fluoride had a melting point of about 130° C. and an average molecular weight of about 50,000. The resulting composition had a total resin solids content of 33 percent.

The outstanding adhesion during elongation of the present compositions was illustrated using aluminum panels coated with the above coating composition, evaluated by comparison with two other panels, similarly prepared except that one was coated with the above polyvinyl fluoride alone and the other with the above amide interpolymer alone. The panels were baked for 60 seconds at 500° F. and subjected to an elongation-adhesion test known as the Ericksen bump test. In this test, the coating is scored and the coated panel is stretched in the scored area. A pressure-sensitive adhesive tape is then applied to the elongated coating and rapidly pulled off the panels. If the coating sticks to the tape instead of the panel when the tape is removed, the adhesion is considered to be poor. Excellent adhesion results when none of the coating is pulled off the panel. The results follow:

| Coating composition containing— | Elongation-adhesion |
|---|---|
| 100 percent polyvinyl fluoride | Poor. |
| 100 percent amide interpolymer | Fair. |
| 5 percent amide interpolymer, 95 percent polyvinyl fluoride | Excellent. |

EXAMPLE 2

This example illustrates the preparation of another coating composition of this invention and the superior heat stability of the resultant coatings:

Twenty parts of the amide interpolymer employed in Example 1 were blended at room temperature with 80 parts of polyvinyl fluoride (as in Example 1) and 150 parts of butyrolactone. The composition had a resins solids content of 40 percent. A white pigment, TiO₂, was dispersed in the composition in a pigment-to-binder ratio of 0.6 to 1.

The coating composition above was then applied to a panel and tested along with a panel coated with a composition in which the resinous vehicle was 100 percent polyvinyl fluoride, but otherwise essentially identical to the first composition. The coatings were cured by baking for 60 seconds at a temperature of 500° F. After curing, the panels were tested for discoloration on overbaking by further baking the coated panels. In most cases, a gradual yellowing of a white coating occurs upon continuous overbake, and the panels in this test were graded from excellent to poor, based on their ability to resist such color impairment. The results follow:

| Coating composition containing— | 500° F. bake (minutes) | | | |
|---|---|---|---|---|
| | 1 | 3 | 5 | 10 |
| 100 percent polyvinyl fluoride. | Good¹ | Fair-poor | Fair-poor | Poor. |
| 80 percent polyvinyl fluoride, 20 percent amide interpolymer. | Excellent | Excellent | Good | Fair. |

¹ Poor adhesion at this bake schedule.

EXAMPLE 3

This example illustrates the preparation of another coating composition of this invention and the superior qualities of film appearance, fabrication, corrosion resistance and water resistance which the resultant coatings possesss.

A coating composition was prepared as in Example 2, except that 50 parts of the amide interpolymer and 50 parts of polyvinyl fluoride were employed, and the pigment was dispersed in the composition in a pigment-to-binder ratio of 0.8 to 1.

Fabrication properties were then evaluated in terms of impact resistance, flexibility and adhesion tests. Adhesion was measured as in Example 1. Flexibility was tested by forming coated panels into a lock seam; an excellent grade denotes no cracking or other coating failure. Impact resistance was tested by dropping metal weights onto the panels from various heights. The tests were carried out with aluminum panels, one being coated with the composition of this invention, another being coated with a 100 percent polyvinyl fluoride film. Each was cured at 500° F. for 60 seconds with metal temperatures in the range of 430°–450° F. The results were as follows:

| Coating composition containing— | Impact resistance | Flexibility | Adhesion |
|---|---|---|---|
| 100 percent polyvinyl fluoride. | Excellent | Excellent | Poor. |
| 50 percent polyvinyl fluoride, 50 percent amide polymer. | do | do | Excellent. |

Similar panels were employed to evaluate in terms of gloss, mar resistance and surface smoothness to the touch. A standard 60° gloss meter was used to determine gloss. The results follow:

| Coating composition containing— | Gloss | Mar resistance | Surface |
|---|---|---|---|
| 100 percent polyvinyl fluoride. | Low | Poor | Rough. |
| 50 percent polyvinyl fluoride, 50 percent amide interpolymer. | High | Good | Smooth. |

Coatings were also applied and baked as above on phosphatized, galvanized steel panels (Bonderite 37). Some of these coatings were tested for corrosion resistance. The panels were coated, baked as above, scoring the coating with an "X" and exposing it to a 5 percent salt spray at a 15° angle at 100° F. for 500 hours. Others were tested for water resistance by scoring and immersing the coating in water at 100° F. for 1,000 hours. The coatings were evaluated by noting the extent of blistering and by testing for adhesion using pressure-sensitive tape, as described above. The results were as follows:

| Coating composition containing— | Adhesion | Blistering |
|---|---|---|
| 100 percent polyvinyl fluoride | Poor | Moderate. |
| 50 percent polyvinyl fluoride, 50 percent amide interpolymer. | Good | None. |

In the water immersion tests, the panels were prepared as in the salt-fog test. The panels were placed in a water bath at 100° F. for 1,000 hours. The results follow:

| Coating composition containing— | Adhesion | Blistering |
|---|---|---|
| 100 percent polyvinyl fluoride | Poor | Moderate. |
| 50 percent polyvinyl fluoride, 50 percent amide interpolymer. | Good | None. |

EXAMPLE 4

This example illustrates the advantages gained by employing amide interpolymers containing acrylonitrile in the coating compositions of the invention.

Two coating compositions were prepared as in Example 3 using two different amide interpolymers. In the first composition, the amide interpolymer contained the following monomers:

Parts by percent
Acrylamide _____ 5.0
Methacrylic acid _____ 3.0
Acrylonitrile _____ 25.0
Ethyl acrylate _____ 67.0 and in the second composition, the amide interpolymer contained the same monomers except that styrene was substituted for acrylonitrile, the same proportions being used throughout in both interpolymers. The coatings were then applied to steel panels and subjected to impact and immediately thereafter tested for adhesion. The impact and adhesion tests were the same as those used in Example 3. The results follow:

| Coating composition containing— | Impact and adhesion |
|---|---|
| 50 percent polyvinyl fluoride, 50 percent amide interpolymer without acrylonitrile. | Good. |
| 50 percent polyvinyl fluoride, 50 percent amide interpolymer with acrylonitrile. | Very good. |

Similar results to those shown are obtained using other amide interpolymers of the class described in place of those on the foregoing examples, such as, for example, those containing methacrylonitrile, butyl acrylate or monomethyl styrene. Also, copolymers of vinyl fluoride can be employed instead of polyvinyl fluoride, such as, for example, vinyl fluoride-vinyl acetate copolymers, with results that are satisfactory for many purposes. Other materials, such as the resinous products mentioned hereinabove, can be added to the compositions as illustrated if desired.

According to the provisions of the patent statutes, there are disclosed above the invention and what are now considered to be its best embodiments. However, it is to be understood that, within the scope of the appended claims, the invention may be practiced otherwise than as specifically described.

I claim:
1. A coating composition comprising (1) from about 25 percent to about 98 percent of a polymer of vinyl fluoride said polymer containing a major proportion of vinyl fluoride, and (2) an aldehyde-modified interpolymer of a polymerizable unsaturated carboxylic acid amide and at least one other copolymerizable ethylenically unsaturated monomer wherein said interpolymer is characterized by containing amido groups derived from said amides with at least 1 amide hydrogen atom replaced by the structure:

wherein R is a member selected from the class consisting of hydrogen and hydrocarbon radicals, and $R_1$ is a member selected from the class consisting of hydrogen and a radical derived by removing the hydroxyl group from an alcohol.

2. The composition of claim 1 wherein at least about 50 percent of the amido groups have a hydrogen atom replaced by the structure:

$$-CH_2OR_1$$

wherein $R_1$ is an alkyl radical containing from 1 to 8 carbon atoms.

3. The composition of claim 1 wherein at least one of the monomers is acrylonitrile or methacrylonitrile.

4. The composition of claim 1 wherein the polymer of vinyl fluoride is polyvinyl fluoride.

5. The composition of claim 1 wherein the amount of the polymer of vinyl fluoride component is about 50 percent by weight.

6. The composition of claim 1 wherein the amide interpolymer component comprises an interpolymer of acrylamide and at least one other copolymerizable ethylenically unsaturated monomer, said interpolymer containing from about 2 percent to about 50 percent by weight of acrylamide in polymerized form, based upon the total weight of said interpolymer, and being characterized by containing amido groups derived from said amide with at least one amido hydrogen atom replaced by the structure:

$$-CH_2OR_1$$

where $R_1$ is an alkyl radical containing from 1 to 8 carbon atoms.

7. The composition of claim 6 in which said interpolymer comprises acrylamide, acrylonitrile or methacrylonitrile and at least one other ethylenic monomer.

8. An article comprising a metal surface having as a coating thereon a cured film of the composition of claim 1.

References Cited

UNITED STATES PATENTS

| 3,118,853 | 1/1964 | Hart et al. | 260—853 |
| 3,231,393 | 1/1966 | Downing et al. | 260—853 |
| 3,324,069 | 6/1967 | Koblitz et al. | 260—31.4 |
| 3,340,222 | 9/1967 | Fang | 260—900 |

SAMUEL H. BLECK, *Primary Examiner.*

J. T. GOOLKASIAN, *Assistant Examiner.*

U.S. Cl. X.R.

117—132, 161; 260—17.3, 30.4, 31.8, 39, 837, 900